Patented Apr. 3, 1945

2,372,671

UNITED STATES PATENT OFFICE 2,372,671

PRODUCTION OF ALKALI METAL HYDRIDE

Virgil L. Hansley, Niagara Falls, N. Y., assignor to E. I. du Pont de Nemours & Company, Wilmington, Del., a corporation of Delaware No Drawing. Application February 15, 1944, Serial No. 522,506

10 Claims. (Cl. 23—204)

This invention relates to the manufacture of alkali metal hydrides.

Freudenberg et al., U. S. P. 1,796,265, describes a process for making alkali metal hydrides in which a solid material substantially inert to alkali metal is mixed with molten alkali metal, e. g., metallic sodium, and the mixture subjected to the action of hydrogen at a temperature of 180° to 300° C. In the usual practice of this process, the alkali metal hydride is used as the solid material. Thus, to make sodium hydride, a quantity of finely divided sodium hydride is placed in a closed container equipped for stirring, a convenient form being a rotatable cylindrical container. This may be provided with baffles for stirring the solid material, or articles such as iron balls, rods or the like, may be included in the charge to assist in stirring when the cylindrical container is rotated on its axis. A quantity of molten sodium is introduced, usually in amounts somewhat less than that required to completely wet the surface of the solid hydride, and thoroughly mixed with the latter. Then, with continued agitation, hydrogen is passed into the container to convert the metallic sodium to sodium hydride. The sodium may be introduced intermittently or continuously, and generally finished hydride is removed from the reactor intermittently, leaving a suitable amount of hydride in the reactor for succeeding operations.

An object of the present invention is to provide an improved process for the manufacture of sodium hydride by reacting sodium with hydrogen. A further object is to improve the process of the above-mentioned Freudenburg et al. patent for making sodium hydride. Another object is to increase the rate of reaction between hydrogen and sodium in the manufacture of sodium hydride. Still other objects will be apparent from the following description.

In accordance with the present invention, hydrogen is reacted with sodium or other alkali metal according to the method of the above-mentioned Freudenberg et al. patent, except that I add to the reaction mixture a small amount of a hydrocarbon which is capable of reacting with sodium to form sodium hydrocarbide. Preferably the amount of hydrocarbon added is from about 0.1 to 1 per cent by weight of the charge in the reactor; in any event not more than about 10 per cent by weight. The hydrocarbon may be added at any desired stage during the process. It may be mixed with the sodium hydride or other solid material utilized prior to the addition of the molten sodium, or it may be added continuously during the hydrogenation operation. For example, a convenient method is to introduce vapors of suitable hydrocarbon into the stream of hydrogen entering the reactor. In another suitable method I may add a small stream of hydrocarbon liquid or vapor separately into the reactor.

A variety of hydrocarbons are suitable for practicing my invention, and any hydrocarbon may be used which will react with sodium, at least under the conditions prevailing in the sodium hydride process, to form a sodium hydrocarbide. By the term "sodium hydrocarbide" I mean a compound containing sodium, carbon, and hydrogen which is formed by reaction between a hydrocarbon and sodium. Such a compound may be formed by an addition reaction between the sodium and the hydrocarbon or by replacement of an active hydrogen atom in the hydrocarbon by sodium. Examples of some hydrocarbons suitable for that purpose are: the isomeric cymenes, isopropyl benzene, the isomeric isopropyl naphthalenes and other aromatic hydrocarbons having the isopropyl group; fluorene, indene, anthracene and their homologs; and various petroleum hydrocarbons. It is understood that pure aliphatic hydrocarbons of the paraffin series will not react with the alkali metals to form hydrocarbides and are not suitable for practicing my invention. However, crude petroleum and petroleum products, which have not been too thoroughly refined, normally contain compounds which readily react with the alkali metals to form hydrocarbides. It is not necessary to isolate the alkali metal reactive compounds, but I may use a petroleum product containing them, for example, kerosene, gasolene, petroleum oils, petroleum jellies, and petroleum waxes. These may be crude materials, such as crude oil or crude products from petroleum distillation cracking processes; or partly refined petroleum products may be utilized. In any case, the suitability of the petroleum product can readily be determined by heating a sample with the alkali metal and observing whether reaction occurs.

In place of the above-described hydrocarbons I may use previously formed alkali metal hydrocarbides. Such hydrocarbides may be prepared by known methods from the above-described hydrocarbons or from other hydrocarbons. For example, the hydrocarbides may be prepared by merely heating the hydrocarbon with alkali metal. I may also prepare and use for my inventions the hydrocarbides described in Muckenfuss, U. S. P. 2,073,973, according to the method described in that patent.

The following examples further illustrate methods of practicing my invention and the results thereby obtained:

*Example 1*

A small cylindrical steel reaction vessel was arranged horizontally, equipped to rotate about its axis and provided with gas inlet and outlet. This was charged with about one pound of granular sodium hydride and a few small pieces of iron to assist in stirring. Molten sodium equal to about 10 to 15% by weight of the hydride was added and the vessel was rotated at about 100 R. P. M. while flowing hydrogen into the vessel at substantially atmospheric pressure and at a rate equal to the rate of hydrogen absorption, i. e., so that no hydrogen escaped from the reactor and maintaining the temperature therein at 300 to 385° C. Before entering the reaction vessel, the hydrogen passed through a tower filled with broken porcelain, kept wet with p-cymene, so that the hydrogen carried a small amount of p-cymene vapor into the reactor. Periodically more molten sodium was added to the reactor. A series of runs was carried out, each run terminating when the metallic sodium added had been substantially completely converted to hydride. A portion of the hydride was removed from the reactor, leaving a "heel" of hydride for the next run. This was continued for 7 runs, to produce 24.8 lbs. of hydride, leaving a "heel" of 458 gms. of hydride in the reactor.

The hydrogen inlet line was then rearranged to by-pass the p-cymene tower, so that the entering hydrogen was free from p-cymene, and the process continued as before for 4 runs, to produce 11.3 lbs. of hydride, leaving a "heel" of 1495 gms. of hydride in the reactor.

The following results were obtained:

| Run | With p-cymene in hydrogen | | Run | Without p-cymene in hydrogen | |
|---|---|---|---|---|---|
| | Weight of hydride heel | Rate of H₂ absorption | | Weight of hydride heel | Rate of H₂ absorption |
| | *gms.* | *l./min.* | | *gms.* | *l./min.* |
| 1 | 327 | 7.2 | 8 | 458 | 7.5 |
| 2 | 493 | 7.1 | 9 | 572 | 5.0 |
| 3 | 518 | 8.6 | 10 | 1,750 | 5.7 |
| 4 | 529 | 8.9 | 11 | 908 | 4.9 |
| 5 | 655 | 7.7 | | | |
| 6 | 850 | 6.2 | | | |
| 7 | 1,080 | 6.9 | | | |

The "heel" of hydride in the reactor in run 8 contained p-cymene from the previous run. As the procedure continued in runs 9, 10, and 11, the p-cymene concentration progressively decreased.

*Example 2*

Sodium hydride was made in a series of runs carried out according to the method of Example 1 in a small reactor, except that p-cymene was not used and the hydrogen entering the reactor was substantially pure, containing no hydrocarbon or other organic compound. The hydride "heel" used at the start of the first run was from a lot of hydride made by reacting hydrogen with a dispersion of sodium in an incompletely refined kerosene and heating to evaporate off most of the kerosene. This hydride contained slightly less than 1% by weight of hydrocarbon, at least in part combined as sodium hydrocarbide.

As a portion of the hydride was removed from the reactor at the end of each run, the concentration of hydrocarbon in the charge progressively decreased from run to run during the procedure.

The following results were obtained:

| Run | Weight of hydride heel | Rate of H₂ absorption |
|---|---|---|
| | *gms.* | *l./min.* |
| 1 | 370 | 1.47 |
| 2 | 447 | 1.60 |
| 3 | 247 | 1.15 |
| 4 | 300 | 0.68 |
| 5 | 362 | 0.14 |

My process is suitable for making the hydrides of the various alkali metals, i. e., sodium, potassium, lithium, cesium, and rubidium. If desired, mixed hydrides can be made by reacting hydrogen with a mixture of one or more of the alkali metals in accordance with my invention.

While the Freudenberg et al. patent describes a reaction temperature of 180 to 300° C., a wider temperature range may be employed, if desired, in practicing my invention. Thus the reaction will occur at temperatures as low as the melting point of the alkali metal, though somewhat slowly. Temperatures as high as 500 to 600° C. may be employed, provided sufficient hydrogen pressure is employed to prevent undue hydride decomposition. Generally, I prefer to carry out the reaction in the temperature range of 200 to 450° C.

The operation may be carried out substantially at atmospheric pressure or at higher pressures, as desired. Other gases may be introduced with the hydrogen, if desired. Such other gases may be inert diluents or may be reactive gases to produce a mixture of hydride and other alkali metal compound. Generally, I prefer to use substantially pure hydrogen at or slightly above atmospheric pressure.

To start the process, I prefer to use the hydride to be produced as the solid material with which the molten alkali metal is mixed. If necessary, such may be produced by previously known processes, e. g., the process of Muckenfuss, U. S. P. 1,958,012. If desired, other solid materials, preferably those inert to the alkali metal may be used, including those described in the Freudenberg, et al. patent and others, e. g., sand, clays, various powered metals, and various salts which are infusible at the reaction temperature.

I claim:

1. A process for manufacture of alkali metal hydride which comprises mixing molten alkali metal with a finely divided solid material and a relatively small amount of a compound having at least 8 carbon atoms selected from the group consisting of alkali metal hydrocarbides and hydrocarbons capable of reacting with alkali metals to form said hydrocarbides and subjecting the mixture to the action of hydrogen at a temperature above the melting point of said alkali metal.

2. A process for manufacture of alkali metal hydride which comprises mixing a molten alkali metal with finely divided alkali metal hydride and about 0.1 to 1% by weight of a compound having at least 8 carbon atoms selected from the group consisting of alkali metal hydrocarbides and hydrocarbons capable of reacting with alkali metals to form said hydrocarbides and subjecting the mixture to the action of hydrogen at a temperature above the melting point of said alkali metal.

3. A process for manufacture of sodium hydride which comprises mixing molten sodium with finely divided sodium hydride and about 0.1 to 1% by weight of a cymene and subjecting the mixture to the action of hydrogen at a temperature above the melting point of sodium.

4. A process for manufacture of sodium hydride which comprises mixing molten sodium with finely divided sodium hydride and about 0.1 to 1% by weight of a liquid petroleum product capable of reacting with sodium to form sodium hydrocarbide and subjecting the mixture to the action of hydrogen at a temperature above the melting point of sodium.

5. A process for manufacture of sodium hydride which comprises mixing molten sodium with finely divided sodium hydride and about 0.1 to 1% by weight of a sodium hydrocarbide and subjecting the mixture to the action of hydrogen at a temperature above the melting point of sodium.

6. A process for manufacture of sodium hydride which comprises mixing molten sodium with finely divided sodium hydride and about 0.1 to 1% by weight of a compound having at least 8 carbon atoms selected from the group consisting of sodium hydrocarbides and hydrocarbons capable of reacting with sodium to form sodium hydrocarbides and subjecting the mixture to the action of hydrogen with continuous agitation at a temperature between the melting point of sodium and about 600° C.

7. A process for manufacture of alkali metal hydride which comprises mixing a molten alkali metal with a finely divided solid material and a relatively small amount of a compound having at least 8 carbon atoms selected from the group consisting of sodium hydrocarbides and hydrocarbons capable of reacting with alkali metals to form alkali metal hydrocarbides and subjecting the mixture to the action of hydrogen at a temperature above the melting point of said alkali metal with continuous agitation at a temperature of about 200 to 450° C.

8. A process for manufacture of sodium hydride which comprises mixing molten sodium with finely divided sodium hydride and about 0.1 to 1% by weight of a cymene and subjecting the mixture to the action of hydrogen at a temperature above the melting point of sodium with continuous agitation at a temperature of about 200 to 450° C.

9. A process for manufacture of sodium hydride which comprises mixing molten sodium with about 0.1 to 1% by weight of a liquid petroleum product capable of reacting with sodium to form hydrocarbide with continuous agitation at a temperature of about 200 to 450° C.

10. A process for manufacture of sodium hydride which comprises mixing molten sodium with finely divided sodium hydride and about 0.1 to 1% by weight of a sodium hydrocarbide and subjecting the mixture to the action of hydrogen with continuous agitation at a temperature of about 200 to 450° C.

VIRGIL L. HANSLEY.